United States Patent [19]

Pfeiffer

[11] Patent Number: 4,833,387

[45] Date of Patent: May 23, 1989

[54] CONTROL CIRCUIT FOR RUNNING A POLYPHASE SYNCHRONOUS MOTOR IN A D-C VOLTAGE NETWORK

[75] Inventor: Ruediger Pfeiffer, Buehl, Fed. Rep. of Germany

[73] Assignee: Robert Bosch GmbH, Stuttgart, Fed. Rep. of Germany

[21] Appl. No.: 168,658

[22] Filed: Mar. 16, 1988

[30] Foreign Application Priority Data

Mar. 20, 1987 [DE] Fed. Rep. of Germany ....... 3709168

[51] Int. Cl.⁴ ............................................. H02P 5/40
[52] U.S. Cl. ..................................... 318/723; 318/685
[58] Field of Search ............... 318/685, 696, 721, 722, 318/723

[56] References Cited

U.S. PATENT DOCUMENTS 4,250,435  2/1981  Alley et al. ......................... 318/696
4,642,543  2/1987  MacMinn ............................ 318/696

Primary Examiner—David Smith, Jr.
Attorney, Agent, or Firm—Michael J. Striker

[57] ABSTRACT

A control circuit for operating a synchronous motor with a polyphase armature winding in a d-c voltage network comprises a switch device for successively connecting the winding phases with the network, a switch signal generator which produces switch signals for the switch device, a logical stage for logically loading the switch devices with said signals. The circuit also includes a voltage/frequency converter, a starting device and a re-starting device. The converter generates a pulse succession which is increased by the starting member from zero to a predetermined value to re-start the motor when its current exceeds a predetermined value.

5 Claims, 2 Drawing Sheets

CONTROL CIRCUIT FOR RUNNING A POLYPHASE SYNCHRONOUS MOTOR IN A D-C VOLTAGE NETWORK

BACKGROUND OF THE INVENTION

The present invention relates to a circuit which causes and controls the running of a synchronous motor provided with a polyphase armature winding.

Circuits of the type under discussion have been known. One of such circuits has been disclosed in DE-OS 30 42 819. The circuit disclosed in this reference is realized so as to successively lock individual phases of the polyphase armature winding by current valves each of which is connected in series with the respective phase of the armature winding positioned in the stator of the motor, and which is arranged between the end of the respective winding phase and the zero potential. The other or opposite ends of the phases of the armature winding are joined together at a star point and are connected via the network switch to the positive potential of the d-c voltage network.

A switch signal generator and the logical stage for a logical control of the current valves are realized by voltage comparators, logical combination members and a ring counter the parallel outputs of which are connected to the control input of the current valves. Voltages which are induced in the winding phases, which are connected one with another in a cyclical manner due to the locked current valve, are compared with each other in the voltage comparators; this results in the output signal in the respective comparator when the voltage induced in the following winding phase is greater than the voltage induced in the previous winding phase. These output signals of the voltage comparators are logically combined ("And") with the output signals of the ring counter in such a fashion that the switch signal can be then applied to a monoflop only when current passes through that following wnding phase with the higher induced voltage due to the opening of the respective current valve. The output of the ring counter connected to the control input of this current valve is connected to the high-potential. The ring counter further counts pulses with the positive flanks of the output pulses of the monoflop so that by this time the high-potential lies at the next counter output, and the current valve, which has been opened for a moment, is closed, and the next-positioned current valve in the cycle becomes opened.

Inasmuch as in the inoperative position of the rotor or the runner of the synchronous motor, no information is available by such an adjustment an auxiliary tact generator is provided, which starts the ring counter to start the motor, and these steps are very slow since they take, for example 0.5 sec. to start the motor. As soon as the direction of rotation of the rotor, the condition of the counter and the voltage points of the induced alternating voltages are combined the synchronous motor becomes self-controlled and accelerates with a maximal torque until its speed reaches the operational value.

SUMMARY OF THE INVENTION

It is an object of the present invention to provide an improved control circuit for running a synchronous motor having a polyphase winding in a d-c voltage network.

It is another object of this invention to provide a control circuit which employs a relatively simple and inexpensive electronics for the voltage comparison and logical combination.

These and other objects of the invention are attained by a control circuit for running a synchronous motor including a polyphase armature winding in a d-c voltage network, comprising switch means for successive connecting individual winding phases of said armature winding to the d-c voltage network; a switch signal generator for producing switch signals for said switch means; and a logical stage interconnected between said switch signal generator and said switch means for a logical loading of said switch means with switch signals; said switch signal generator including a voltage/frequency converter which produces a succession of rectangular pulses having a pulse succession frequency depending on a voltage level applied thereto, a starting RC member connected to said voltage/frequency converter and being started upon switching-on of the d-c voltage network, said starting member feeding said voltage/frequency converter with a time dependent voltage increasing from zero at a start point of said starting member to a predetermined control value, and a re-starting unit connected parallel to said starting RC member and being operative according to running-up of said motor and newly starting said starting member when a predetermined value of a current passing through the motor is exceeded e.g. due to falling out of synchronism.

Due to the gradual increase in the input voltage of the voltage/frequency converter, effected by the starting member upon the switching-on of the motor and its non-synchronous running, the converter generates swich pulses, the succession frequency of which progressively increases, starting from zero. The switch pulses firstly cause only a very slow cyclical running of the switch means in the armature winding so that the rotor can be reliably adjusted to run in the predetermined direction of rotation. The rotor then rotates with the quickly-increasing speed until it reaches a synchronous speed when a maximal possible voltage is applied to the input of the voltage/frequency converter. If the motor is out of synchronous cycle the starting member is actuated so that the voltage at the input of the voltage/frequency converter is reduced for a short time to zero and then again is increased, depending on the time of running, to the final voltage value. Thus the rotor again runs synchronously.

The starting member may include a capacitor and at least one resistor means for charging said capacitor, a voltage of said capacitor being applied to said converter.

The re-starting unit may include an inverting Schmitt trigger having two logical inputs and an output connected to said converter, first of said inputs being loaded with a control voltage derived from the current passing through the motor and a second of said inputs being loaded with a control voltage approximately proportional to the voltage at said capacitor.

The voltage/frequency converter may be formed by a voltage-controlled oscillator the control voltage of which is derived from the voltage of said capacitor.

The re-starting unit may be a NAND-Schmitt trigger with two logical inputs as set forth above. If the motor runs out of synchronism, its current steeply increases and the control voltage derived from the highly increased current of the motor reaches the input threshold of the Schmitt trigger. With the charged capacitor the Schmitt trigger is switched on and places the control input of the converter at zero. The capacitor is closed and discharged for a short time whereby the control voltage which is applied at the Schmitt trigger and derived from the capacitor voltage is reduced in the same manner. As soon as this control voltage falls below the switch-off threshold of the invertible Schmitt trigger the latter is blocked again and the charging process of the capacitor and the starting process of the rotor connected therewith is carried out again.

The aforementioned resistor means for charging the capacitor may be formed by a voltage divider having two voltage taps, a first of said voltage taps being high-potential and being connected to a control input of said converter or voltage controlled oscilator and to said capacitor and a second of said voltage taps being low-potential and being connected to one of the inputs of said Schmitt trigger and, at the same time, to an additional capacitor, said capacitor having a common connection point connected to a zero potential of the d-c voltage network.

The circuit may further include a resistor interconnected between a star point of a said armature winding and a zero or positive potential of the d-c voltage network, said resistor being connected to said Schmitt trigger to apply a voltage drop at said resistor to one of said inputs of said Schmitt trigger.

The switch means may include electronic current valves the number of which correspond to the number of the winding phases, each current valve being series-connected with a respective winding phase.

The logical stage may include a ring counter having a count capacity corresponding to the number of phases of said armature winding, said counter including outputs parallel-connected to respective control inputs of said current valves and an input connected to said oscillator which supplies said counter with rectangular pulses which appear directly or indirectly as count pulses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
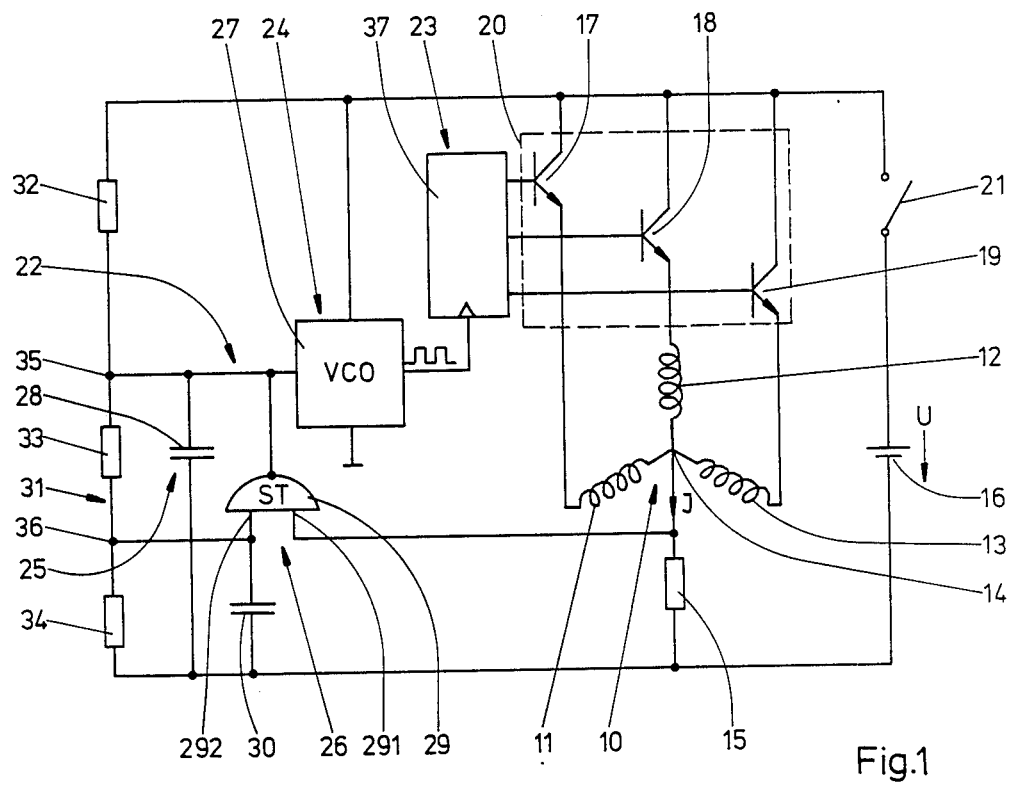
FIG. 1 is a circuit diagram of the circuit for running a synchronous motor in a d-c voltage network.

Referring now to the drawings in detail, and firstly to FIG. 1 thereof, it is seen that this figure illustrates a principle circuit diagram for running a synchronous motor in a d-c voltage network. Reference numeral 10 designates an armature winding provided in the stator of the synchronous motor. In the exemplified embodiment, the three-phase winding with three winding layers 11, 12, 13 is provided. Also possible is any other number of winding phases. The non-shown rotor of the synchronous motor is at least two-pole and is provided with permanent magnets. The ends of the winding phases 11, 12, 13 are connected to each other at a common star point 14 which is connected via a resistor 15 with a negative potential of the d-c voltage network, which is represented in FIG. 1 by a d-c voltage supply source 16. The other ends of the winding phases 1 to 13 are connected each via electronic current valves 17, 18, 19 of a switch device 20 and via a switch 21 with the positive potential of the d-c voltage network 16. Electronic current valves are in the form of power transistors or power end amplifiers. Individual winding phases 11 to 13 of the armature winding 10 can be successively connected to the d-c voltage network 16 by the corresponding control of the switching device 20.

For controlling the switching device 20, the circuit according to the invention includes a switch signal generator 22 which generates switch signals for the device 20, and a logical stage 23 connected in series between the switch signal generator 22 and the switching device 20 and which serves for supplying in proper order the switch signals to the switching device 20. The switch signal generator 22 includes a VCO or voltage/frequency converter 24, a starting element 25 connected parallel to the control input of voltage/frequency converter 24, and a re-starting unit 26 operative after the run-up of the synchronous motor. The voltage/frequency converter 24 which here is formed as a voltage-controlled oscillator 27 identified in short as VCO, generates at its output a succession of rectangular pulses, the frequency of which depends upon the voltage level at the control input of VCO 27. The starting element 25 is connected with contacts of the d-c voltage network, i.e. between the switch 21, and together with the re-starting unit 26 to the ground contact of the d-c power source 16. Upon the start of the starting element 25, the voltage at the control input of the voltage/frequency converter 24 or VCO 27 increases from 0 to a given value.

The starting element 25 is formed by a capacitor 28 which is charged by means of at least one resistor. Here, a voltage divider 31 serves this purpose. The capacitor voltage is applied as a control voltage to the control input of VCO 27. The re-starting unit 26 includes an inverting Schmitt trigger 29 with two logical inputs 291 and 292. Measuring resistor 15 is connected to the logical input 291. A control voltage which is proportional to the motor current and picked off at the measuring resistor 15 between the star point 14 of the winding 10 and the zero or ground potential fo the d-c voltage network 16 lies at the input 291. A control voltage proportional to the voltage of capacitor 28 and which is generated by a capacitor 30 lies at the input 292. The output of the Schmitt trigger 29 is connected with the control input of the VCO 27, which is also connected with capacitor 28. In order to load and unload capacitors 28 and 30, a voltage divider 31 with resistors 32 to 34 and two taps 35, 36 is connected via the on/off switch 21 with the d-c voltage network 16. The high potential tap 35 of the voltage divider 31 is connected with the control input of VCO 27, the output of the Schmitt trigger 29 and a connection of the capacitor 28. The low potential tap 36 is connected together with a connection of capacitor 30 to the second logical input 292 of the Schmitt trigger 29. Respective other connections of the capacitors 28, 30 are connected to the zero or ground potential of the d-c voltage network 16. The logical stage 23 is formed as a simple ring counter with three parallel outputs which are connected with the control inputs of respective transistors 17, 18 and 19. Rectangular pulses at the output of VCO 27 are supplied as count pulses to the count or clock input of the ring counter 37. The latter counts with each count pulse one step further, whereby a successive output potentials are switched at the individual outputs of the ring counter 37 from logic L to logic H and vice versa. Only the count output always leads to H-potential. If the counter stage reaches "3" the ring counter 37 is automatically reset.

Figure 2:
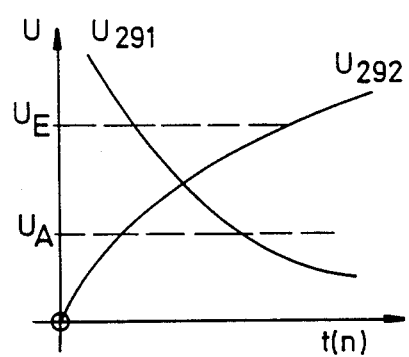
FIG. 2 is a graph of a voltage at respective inputs of the NAND-Schmitt trigger ST of the circuit of FIG. 1 upon switching on the d-c voltage network.

The mode of operation of the circuit according to the invention is as follows:

When on/off switch 21 is open the synchronous motor is inoperative and capacitors 28, 30 are unloaded. When switch 21 is closed the synchronous motor is switched on. Capacitors 28 and 30 are charged by voltage divider 31. The voltage gradient at capacitor 30 is shown in FIG. 2, depending on time t or the number of revolutions n of the synchronous motor. This voltage gradient is designated at $U_{292}$. The voltage gradient at capacitor 28 is approximately proportional to that of capacitor 30. The control voltage of VCO 27 thereby gradually or progressively increases from zero until it reaches a final value predetermined by the voltage divider 31. VCO 27 generates rectangular pulses the succession frequency of which progressively increases. Thereby, the ring counter 37 steps up firstly very slowly and then increasingly faster. The winding phases 11 to 13 of winding 10 are switched on one after another and with increasing acceleration to the d-c voltage network via transistors 11 to 13. Since the stepping on of the individual winding phases is at the beginning very slow the rotor can be firstly reliably adjusted and put in rotation with a slow gradually rotation field in the correct direction of rotation by the winding phases of the armature winding. The rotor accelerates with the increasing frequency of rectangular pulses, which leads to a further switching of the winding phases 11—13 and thus to a more frequent rotation of the magnetic field. If a predetermined maximal value of the voltage on capacitor 28 is achieved by the voltage divider 31 the succession of rectangular pulses of VCO 27 has a constant pulse succession frequency and the rotor runs synchronously.

During the start of the motor, a relatively high current flows through resistor 15 between the star point 14 of winding 10 and the zero potential of the d-c voltage network 16. This switching current, however decreases with the increasing speed h of the rotor. The voltage gradient at the resistor 15 and thereby at the logical input 291 of the Schmitt trigger 29 is also shown in FIG. 2 wherein it is denoted as $U_{291}$. FIG. 2 also depicts the switch-on voltage $U_E$ and the switch-off voltage $U_A$ of the Schmitt trigger 29 with dotted lines. If the switch-on voltage $U_E$ at both control inputs 291 and 292 is exceeded the Schmitt trigger 29 is switched on and its output is logical "0". If the voltage at both control inputs 291 and 292 of the Schmitt trigger 29 falls below the switch-off voltage $U_A$, the Schmitt trigger is switched off and the potential at its output would be logical "1". As shown in FIG. 2 the latter condition is fulfilled upon the switching-on of the motor so that the Schmitt trigger 21 remains switched off.

Figure 3:
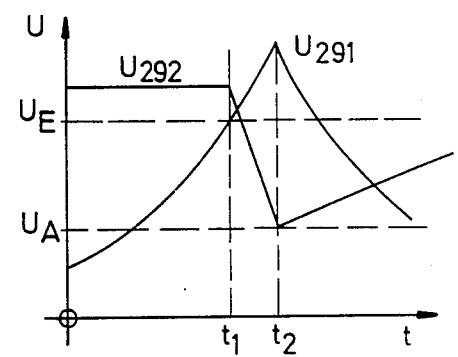
FIG. 3 is a graph showing voltages at the two inputs of the NAND-Schmitt trigger of the circuit of FIG. 1 during the balling out of the synchronism of the motor.

If the synchronous motor, during the running-up period or somewhere during the operation is out of pace the motor current I which flows through resistor 15 is increased very strongly. The gradient control voltages at both logical inputs 291 and 292 is shown for this case in FIG. 3. The control voltage $U_{292}$ applied to the Schmitt trigger from capacitor 30 is firstly constant due to the constant charging of capacitor 30 and becomes greater than the switch-on voltage $U_E$ of the Schmitt trigger 29 whereas the voltage $U_{291}$ picked off at resistor 15 increases as the motor current I is increased, and finally exceeds, at time point $t_1$, the switch-on voltage $U_E$ of the Schmitt trigger 29. The Schmitt trigger at this moment is switched on and applies a logical "0" to the control input of VCO 27. Thereby capacitors 28 and 30 become discharged. As the control voltage $U_{292}$ increases with the increase of the motor current I the control voltage $U_{292}$ quickly reduces as capacitor 30 is discharged and falls below the switch-off voltage $U_A$ of the Schmitt trigger 29 at the time point $t_2$. Thus the Schmitt trigger 29 is again switched off, and capacitors 28 and 31 are charged again by the voltage divider 31. The increased control voltage at the control input of VCO 27 leads to the increase of the frequency of counted pulses at the ring counter 37 whereby the synchronous motor runs up again and finally locks in synchronism. The control voltage $U_{292}$ reduces with the decreasing motor current I as shown in FIG. 2 whereas the control voltage $U_{292}$ increases with charging of the capacitor 39, as shown in FIG. 2.

The invention is not limited to the aforedescribed preferred embodiment. The switching device 20 may have three parallel series circuits each formed by two power transistors which would be connected through the common resistor 15 and the switch-on-off switch 21 to the d-c voltage network. The ends of the windings of the phases 11—13 of the armature winding 190 would be joined at the star point 14 while their opposite ends would be then connected to three different connection taps each of which would be positioned between two power transistor of each series circuit. The power transistors would be also controlled by the switch signal generator 22 with the logical stage 23 whereby two power transistors of each circuit, which are connected to the respective winding phases would be made conductive simultaneously and therefore there would be always a condition in which two winding phases would be switched on series and connected to the d-c voltage network by resistor 15. The control voltage $U_{291}$ of the Schmitt trigger 29 would be again picked off at the resistor 15.

It will be understood that each of the elements described above, or two or more together, may also find a useful application in other types of control circuits for operating polyphase synchronous motors in a d-c voltage network differing from the types described above.

While the invention has been illustrated and described as embodied in a circuit for operating a polyphase synchronous motor in a d-c voltage network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A control circuit for running a synchronous motor including a polyphase armature winding in a d-c voltage network, comprising switch means for successive connecting individual winding phases of said armature winding to the d-c voltage network; a switch signal generator for producing switch signals for said switch means; and a logical stage connected between said switch signal generator and said switch means to control loading of said switch means with switch signals; said switch signal generator including a voltage/frequency converter which produces a succession of rectangular pulses having a pulse succession frequency depending on a voltage level applied to a control input thereof, a starting member connected to said control input of the converter and being started upon switching-on of the d-c voltage network, said starting member feeding said converter with a time dependent voltage increasing from zero at a start point of said starting member to a predetermined control value, and a re-starting unit connected parallel to said starting member and being activated in response to a running-up condition of said motor to restart said starting member when a predetermined value of a current passing through the motor is exceeded; said starting member including a first capacitor connected via resistor means to the d-c voltage network, whereby voltage of said first capacitor being applied to said control input of the converter; said re-starting unit including an inverting Schmitt trigger having two logical inputs and an output connected to said control input of the converter, first of said logical inputs being loaded with a control voltage approximately proportional to the voltage at said first capacitor; said starting member further including an additional capacitor and said resistor means being formed by a voltage divider having two voltage taps, a first of said voltage taps being high-potential and being connected to said control input of the converter and to said first capacitor, and a second of said voltage taps being low-potential and being connected to a connection of one of the logical inputs of said Schmitt trigger to said additional capacitor, and said first capacitor and said additional capacitor having a common connection connected to a zero potential of the d-c voltage network.

2. The circuit as defined in claim 1 wherein said running-up condition is the falling out of synchronism of said motor.

3. A control circuit for running a synchronous motor including a polyphase armature winding in a d-c voltage network, comprising switch means for successive connecting individual winding phases of said armature winding to the d-c voltage network; a switch signal generator for producing switch signals for said switch means; and a logical stage connected between said switch signal generator and said switch means to control loading of said switch means with switch signals; said switch signal generator including a voltage/frequency converter which produces a succession of rectangular pulses having a pulse succession frequency depending on a voltage level applied to a control input thereof, a starting member connected to said control input of the converter and being started upon switching-on of the d-c voltage network, said starting member feeding said converter with a time dependent voltage increasing from zero at a start point of said starting member to a predetermined control value, and a re-starting unit connected parallel to said starting member and being activated in response to a running-up condition of said motor to restart said starting member when a predetermined value of a current passing through the motor is exceeded; said starting member including a first capacitor connected via at least one resistor means to said d-c voltage network, and voltage of said capacitor being applied to said control input of the converters; said re-starting unit including an inverting Schmitt trigger having two logical inputs and an output connected to said converter, means for loading a first of said logical inputs with a control voltage derived from the current passing through the motor and means for loading a second of said logical inputs with a control voltage approximately proportional to the voltage at said first capacitor; and means for loading the first logical input including a measuring resistor connected between star point of said armature winding and a zero or positive potential of the d-c voltage network, and said means for loading the second logical input including an additional capacitor connected to a tap of said resistor means.

4. The circuit as defined in claim 3, wherein said switch means includes electronic current valves the number of which correspond to the number of the winding phases, each current valve being series connected with a respective winding phase.

5. The circuit as defined in claim 4, wherein said logical stage includes a ring counter having a count capacity corresponding to the number of phases of said armature winding, said counter including outputs parallel-connected to respective control inputs of said current valves and an input connected to said oscillator which supplies said counter with rectangular pulses which appear directly or indirectly as count pulses.

* * * * *